United States Patent [19]

Ehrlinger

[11] 4,410,073
[45] Oct. 18, 1983

[54] AXLE DRIVE MECHANISM

[75] Inventor: Friedrich Ehrlinger, Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 209,891

[22] Filed: Nov. 24, 1980

[30] Foreign Application Priority Data

Dec. 5, 1979 [DE] Fed. Rep. of Germany ....... 2948895

[51] Int. Cl.³ .............................................. B60K 41/24
[52] U.S. Cl. .................................................. 192/18 A
[58] Field of Search .................... 192/12 C, 15, 18 R, 192/18 A, 91 A, 91 R, 70.27, 70.28, 70.29, 4 A

[56] References Cited

U.S. PATENT DOCUMENTS

| 2,901,066 | 8/1959 | Garmager | 192/91 A |
| 3,000,478 | 9/1961 | Carter | 192/18 A |
| 3,202,249 | 8/1965 | Schubert | 192/18 A |
| 3,696,898 | 10/1972 | Sommer | 192/18 A |
| 3,893,556 | 7/1975 | Lech et al. | 192/91 A |
| 4,129,204 | 12/1978 | Hedgcock | 192/70.27 X |
| 4,181,042 | 1/1980 | Rau et al. | 192/91 A |

FOREIGN PATENT DOCUMENTS

| 1998383 | 12/1968 | Fed. Rep. of Germany . |
| 2726687 | 6/1977 | Fed. Rep. of Germany . |
| 2946477 | 11/1979 | Fed. Rep. of Germany . |

Primary Examiner—George H. Krizmanich
Attorney, Agent, or Firm—Karl F. Ross; Herbert Dubno

[57] ABSTRACT

The mechanism comprises a main shaft 4, a drive wheel 5 non-rotatable thereon, a clutch 2 having a disc carrier 6 non-rotatable with respect to the drive wheel 5, and a parking brake 3 lockable with respect to the drive wheel 5 and disc carrier 6. A spring 7 through a transmission piston 9 acting on the carrier 6 closes the clutch 2, and a hydraulic piston 8 with a pressure chamber 55 opens the clutch 2. Wet multi-disc clutches and brakes are preferred. The transmission piston may be connected to the power piston 9. The mechanism is suitable for vehicles drivable by more than one axle.

4 Claims, 1 Drawing Figure

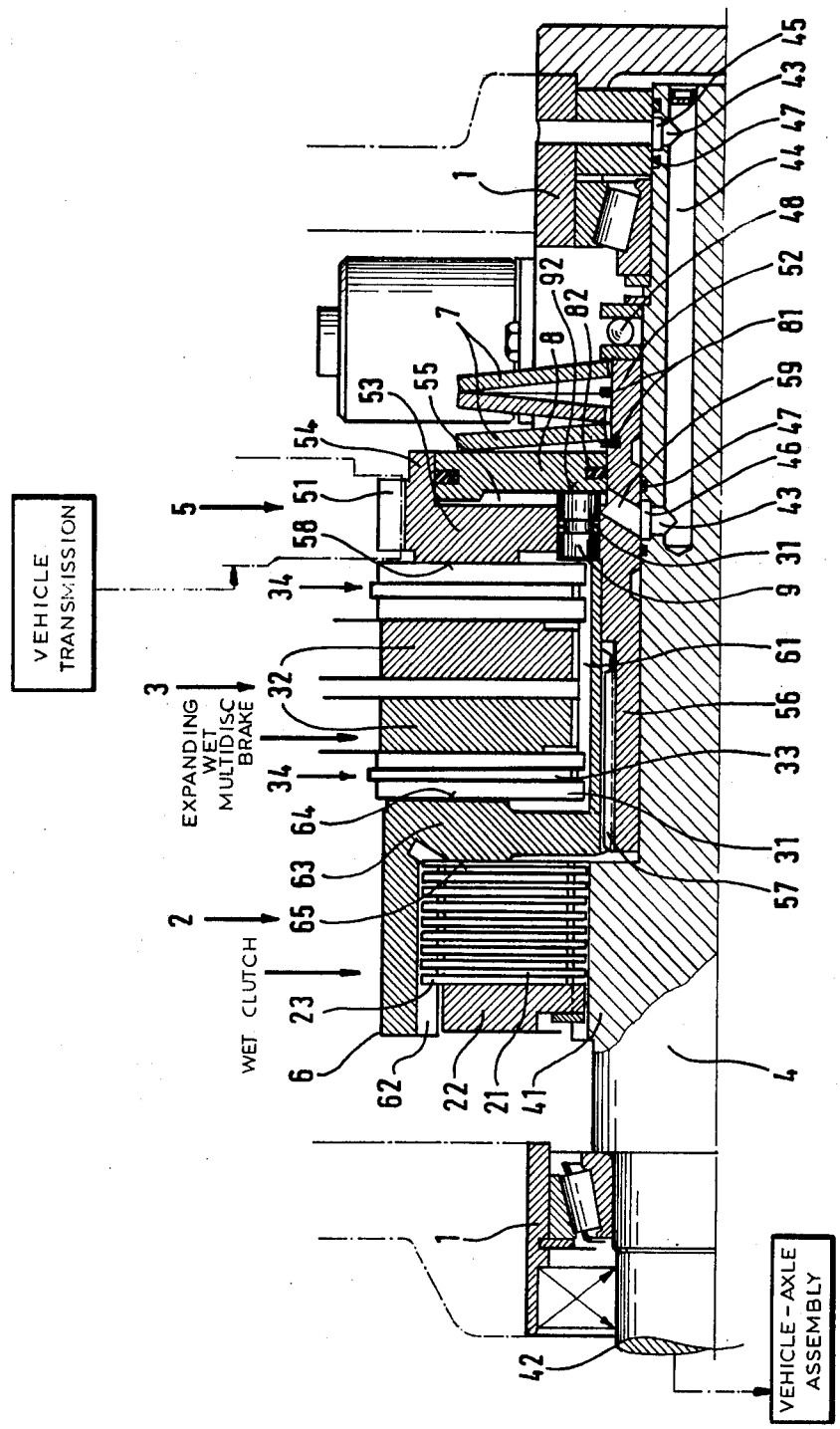

AXLE DRIVE MECHANISM

FIELD OF THE INVENTION

The invention relates to an axle drive mechanism for a vehicle drivable by more than one axle.

Axle drives with clutches are known which enable an optional connection to be made between the front axle of a tractor and its transmission. Tractors of this kind are equipped with parking brakes arranged either on the main drive axle or on the transmission or added onto the transmission. What is common to all these parking brakes is that they act only upon the main drive axle, for example the rear axle. However, development in tractors is leading to ever greater front axle loads with more and more accessories so that locking of the rear axle is no longer sufficient.

SUMMARY OF THE INVENTION

A mechanism according to the invention comprises a main shaft, a drive wheel non-rotatably mounted on the main shaft, a clutch disc carrier angularly coupled to but axially movable with respect to the drive wheel whereby the main shaft can be brought into engagement with the drive wheel, and a parking brake lockable with respect to the drive wheel and disc carrier. This enables all drivable axles to be locked by operating the parking brake without having to consider the position of the clutch for the engageable axle.

By accommodating the parking brake in the axle drive in connection with the clutch, the drive axle can be blocked against rotation by the interaction between the brake and axle even when this axle is not connected with the transmission. The locking action of the parking brake is non-positive on the drive wheel but positive on the main drive shaft, so that all drive shafts both those connected to the transmission all the time and those which can be brought into play are locked in position when the parking brake is operated. In addition, the arrangement requires little space, and provides a technically favorable solution and a simple construction.

A wet multi-disc clutch and a wet expanding multi-disc brake are preferred. Accommodation in one housing is particularly simple and cost-effective because there is no need for dry chambers to be sealed off against one another. Such a wet load-engageable clutch is subject to only a small amount of wear and requires little maintenance. A spring is preferably provided for closing, and hydraulic means for opening the clutch. This facilitates a favorable and simple construction. The axial load of the parking brake can be supported entirely by the main shaft so that no additional axial load has to be absorbed by the main shaft bearing.

It is possible to relieve the clutch from spring pressure by supplying fluid to the clutch-opening pressure chamber. However, when the parking brake is closed, the clutch remains closed and only opens when the parking brake is released. The fluid, by acting upon the pressure piston, not only opens the clutch, but has the effect, via the pressure surface on the transmission piston of maintaining the discs in the clutch lightly in touch with one another. This contact pressure can be adjusted in a very simple way by altering the diameter of the transmission piston. It is also possible to ventilate the clutch i.e. not let the discs touch each other by simply connecting the pressure piston and transmission piston or constructing them in one piece. The hydraulic actuating cylinder may be superimposed on the parking brake, and permanently or intermittently connected to a service brake circuit.

BRIEF DESCRIPTION OF THE DRAWING

The sole FIGURE of the drawing is a half-section through an axle drive mechanism provided with a parking brake according to the invention.

FIG. 1 shows an axle drive with a clutch 2 and a parking brake 3 inside a housing 1. A main shaft 4 arranged inside and mounted in the housing 1 has a collar 41 which is designed as both a carrier for inner discs 21 and an end disc 22 of the clutch 2, and as a drive shaft connection 42 for the vehicle axle (not shown in detail).

Coaxially surrounding this main shaft 4 of the axle drive and axially fixed but rotatable thereon via collar 52, is the drive gear 5 intergral with this collar 52, which is driven via radial toothing (gear) 51 from an intermediate gear of the transmission T shown only in dot-dash outline in FIG. 1. The first collar 52 of the drive gear 5 carries springs 7 and a pressure piston 8, which in conjunction with a web 53 and a tooth crest 54 of gear 5 forms a pressure chamber 55. A second collar 56 of wheel 5 carries a toothing (splines) 57 in non-rotatable connection with a disc carrier 6 whereby the disc carrier 6 is locked to gear 5. The second side of the web 53 is shaped as a reaction member 58 for the parking brake 3, and the web itself has an aperture for a transmission piston 9 between the pressure piston 8 and the disc carrier 6.

Inner discs 31 of the parking brake 3 are arranged on external toothings 61 on disc carrier 6 extending parallel to the main shaft 4 and outer discs 23 of clutch 2 are arranged on internal toothings 62 of the disc carrier 6 (which is Z-shaped in profile). The discs are arranged so as to be non-rotatable, but axially movable. A radially extending connecting web 63 through its first side acts as a reaction member 64 for the parking brake 3, and through its second side as a pressure piston 65 for the clutch 2. The parking brake 3 also has expanding jaws 32 firmly attached to the housing 1 and outer discs 33.

The drive connection to the axle from the transmission is effected with the clutch 2 by pressure from the springs 7 via the pressure piston 8, the transmission piston 9 and the disc carrier 6. The second side of the radially extending connecting web 63 acting as a pressure piston 65 presses against the discs 21,23 of the clutch 2 which are supported against the end disc 22. Thus a non-positive connection is set up between the main shaft 4 and the disc carrier 6 which is positively locked onto the drive gear 5.

To open the clutch 2, pressure fluid is passed into the pressure chamber 55 via bores 43,44 and annular grooves 45,46 in the main shaft 4 and bores 59 in the collar 52 of the drive gear 5. The pressure piston 8 moves in the direction of the springs 7 thus relieving the disc carrier 6 via the transmission piston 9. The resulting high axial pressure of the springs 7 is cushioned by thrust bearings 48 to reduce friction.

By stops 81 the path of the pressure piston 8 is limited. Altering the size of the pressure surface 92 on the transmission piston 9 makes it possible for the discs 21 and 23 to touch each other as a result of the pressure remaining when the clutch 2 is open. If the transmission piston 9 is connected with the pressure piston 8—either in a one-piece construction or by positive locking with a Seeger ring for example—it is also possible to achieve ventilation between the discs 21 and 23 of the clutch 2.

If the brake linkage of the parking brake 3, which causes the expanding jaws 32 to operate, is superimposed by a force activated by a service brake system—for example by a hydraulic operating piston—the parking brake 3 becomes an additional wear—resistant service brake. By this arrangement permanent or optional operation of the brake is possible. The pressure chamber 55 and the supply lines for the pressure fluid are protected against excessive pressure loss by seals 47,82.

When the parking brake 3 is applied, not only the axle engageable via the clutch 2 but also the main drive axle connected via the transmission is locked. This is independent of whether the clutch 2 is closed due to the pressure of the springs 7 or of the fluid in the pressure chamber 55.

The parking brake may be operated purely mechanically or hydraulically or pneumatically. With a mechanical operation, spheres or cams—not illustrated—would be employed to press the two expanding jaws 32 nonrotatably attached to the housing 1 in an axial direction against disc packets 34. With this arrangement, the support would be effected on the one side against the side of the web 53 of the drive gear 5 shaped as reaction member 58, on the other side via the radially extending web 63 of the disc carrier 6, and via the disc packet 34 of the clutch 2 against the end disc 22 axially fixed to the drive shaft 4.

It is feasible for instance to arrange pressure springs instead of the saucer springs 7, or to use the parking brake 3 or parking/service brake combination only as an additional wear-resistant service brake. Thus a hydraulic actuating cylinder may be superimposed on the parking brake, and permanently or intermittently connected to a service brake circuit.

I claim:

1. A selectively operable axle drive mechanism for a vehicle having more than one driving axle, comprising:
   an axle housing:
   a main shaft rotatable in said housing and axially fixed therein;
   a drive gear axially fixed on said main shaft and angularly displaceable relative thereto;
   a multidisc clutch in said housing having a first group of discs nonrotatably connected to said shaft and a second group of discs interleaved with the discs of said first group and nonrotatably connected to said drive gear, said discs forming a stack axially spaced from said drive gear, said clutch being provided with a spring acting upon said stack to compress the same and with pressurizable means responsive to fluid pressure to relieve said spring, said pressurizable means including a carrier for said second group of discs, said carrier being axially shiftable relative to said drive gear but nonrotatably coupled therewith; and
   a parking brake disposed between said stack and said drive gear around said shaft, said parking brake having at least one member connected to said housing, said operating means effective upon actuation of said parking brake and braced between said member and said carrier and between said member and said drive gear for frictionally connecting said carrier, said housing and said drive gear together, said operating means acting upon said carrier to compress said stack.

2. The axle drive mechanism defined in claim 1 wherein said clutch is a wet clutch and said parking brake is an expanding wet multidisc brake.

3. The axle drive mechanism defined in claim 1 wherein said drive gear has a first collar coaxially surrounding said shaft, carrying said spring and carrying a reaction member axially shiftable on said first collar, said drive gear having a second collar extending axially along said shaft, keyed to and slidably carrying said carrier, said reaction member and said drive gear defining a pressurizable compartment forming said pressurizable means, said reaction member being operatively coupled to said carrier by at least one element traversing said drive gear.

4. The axle drive mechanism defined in claim 3 wherein said element is a piston dimensioned to maintain pressure on said stack sufficient to keep the discs of the two groups in slight contact with one another even in a nonactuated condition of said clutch.

* * * * *